(12) United States Patent
Wilton et al.

(10) Patent No.: US 8,292,055 B2
(45) Date of Patent: Oct. 23, 2012

(54) SELF-ADJUSTING MECHANISMS FOR CLUTCHES

(75) Inventors: Daryl A Wilton, Macomb, MI (US);
James M. Hart, Belleville, MI (US);
Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 482 days.

(21) Appl. No.: 12/612,514

(22) Filed: Nov. 4, 2009

(65) Prior Publication Data

US 2011/0100777 A1 May 5, 2011

(51) Int. Cl.
*F16D 25/08* (2006.01)
*F16D 25/10* (2006.01)
*F16D 13/75* (2006.01)

(52) U.S. Cl. ............. 192/85.56; 192/85.62; 192/48.607; 192/70.252; 192/111.12

(58) Field of Classification Search ............. 192/70.252, 192/85.62, 111.12, 111.14
See application file for complete search history.

(56) References Cited

U.S. PATENT DOCUMENTS

| | | | | |
|---|---|---|---|---|
| 2,421,869 A * | 6/1947 | Brock | ...................... | 192/70.252 |
| 3,946,845 A * | 3/1976 | Kamio | ...................... | 192/70.252 |
| 4,068,750 A * | 1/1978 | Gatewood | ................ | 192/70.252 |
| 4,429,777 A * | 2/1984 | Taig | .......................... | 192/111.12 |
| 4,556,137 A * | 12/1985 | Abe | .......................... | 192/111.12 |
| 5,029,678 A * | 7/1991 | Koshizawa | .............. | 192/111.12 |

* cited by examiner

*Primary Examiner* — Richard M. Lorence

(57) ABSTRACT

In transmissions having input clutches, a lever arm configured as a second class lever is pivoted at one end, applies force to a clutch bearing near its middle and is acted upon by a linear actuator at its opposite end. The present invention relates to mechanisms for adjusting the location of the pivot to compensate for clutch wear. The fixed pivot is replaced by a linear one way clutch mechanism. As the clutch facing wears and the clutch is activated, an extension of the actuating lever arm abuts a stationary stop beyond the one way clutch pivot which translates the pivot point provided by the one way clutch mechanism toward the clutch to reduce pre-travel and compensate for clutch facing wear. Hydraulic and spring biasing of the pivot point are also disclosed.

20 Claims, 3 Drawing Sheets

_US 8,292,055 B2_

SELF-ADJUSTING MECHANISMS FOR CLUTCHES

FIELD

The present disclosure relates to adjustment mechanisms for clutches and more particularly to wear compensating adjustment mechanisms for motor vehicle clutches for single and dual clutch transmissions.

BACKGROUND

The statements in this section merely provide background information related to the present disclosure and may or may not constitute prior art.

Motor vehicle transmissions are often divided into two distinct classes: manual transmissions and automatic transmissions. Manual transmissions typically have a plurality of operator selected gears and a manual (foot operated) clutch whereas automatic transmissions sequence gear selection and clutch operation, generally without active operator involvement.

A recent addition to the transmission repertoire combines elements of both manual and automatic transmissions: the dual clutch transmission or DCT. The dual clutch transmission utilizes meshing pairs of gears and synchronizer clutches much like a manual transmission but with a pair of friction clutches. Because selection and engagement of gears and clutch are typically under the control of an electronic control system (a transmission control module or TCM), the dual clutch transmission essentially functions as an automatic transmission.

The meshing gears are arranged in a dual clutch transmission such that alternating gears in an upshift (or downshift) sequence, e.g., first, third and fifth, are associated with one of the two clutches and the interleaved, alternating gears, e.g., second, fourth and sixth are associated with the other clutch. In this way, while one gear and clutch is engaged and operating, for example, second gear, the next higher gear in an upshift sequence, for example third, is being synchronized and connected to a driveshaft so that the actual shift from second to third involves essentially simply disengaging the one clutch and engaging the other clutch.

This shift sequence of dual clutch transmissions provides very rapid adjacent gear upshifts and downshifts and is one of the most desirable and appreciated features of this transmission type. Shift times of about 200 milliseconds or less are achievable by such transmissions.

In order to achieve such reduced shift sequence times, it is necessary that, among other considerations, clutch travel must be reduced to a minimum. It can readily be appreciated that excessive clutch pre-travel, i.e., travel of the clutch actuator and linkage from a released position to an applied position simply delays a desired clutch and transmission action. Moreover, as the clutch facing material wears, the pre-travel will increase, thus effectively further slowing the response time of the clutch. Accordingly, it is highly desirable to configure both a single and a dual clutch transmission clutch to reduce pre-travel and provide optimum clutch response time. The present invention is so directed.

SUMMARY

The present invention provides adjustment mechanisms for motor vehicle clutches for single and dual clutch transmissions. In transmissions having one or two input clutches, a lever arm configured as a second class lever is pivoted at one end, applies force to a clutch bearing near its middle and is acted upon by a bi-directional linear actuator at its opposite end. The present invention relates to mechanisms for adjusting the location of the pivot to compensate for clutch wear. The fixed pivot is replaced by a linear one way clutch device. As the clutch facing wears and when the clutch is activated, an extension of the actuating lever arm abuts a stationary stop beyond the one way clutch pivot which repositions the pivot point toward the input clutch to reduce pre-travel and compensate for clutch wear. Hydraulic and spring biased adjustment of the one way clutch pivot are also disclosed.

Thus it is an object of the present invention to provide an adjustment mechanism for a single clutch of a motor vehicle transmission.

It is a further object of the present invention to provide an adjustment mechanism for both clutches of a dual clutch transmission for a motor vehicle.

It is a still further object of the present invention to provide an adjustment mechanism for a clutch for a motor vehicle transmission having a moveable pivot.

It is a still further object of the present invention to provide an adjustment mechanism for a clutch for a motor vehicle transmission having a pivot including a one way clutch.

It is a still further object of the present invention to provide an adjustment mechanism for a clutch for a motor vehicle transmission having a an extension on the clutch lever arm and a stop adjacent the pivot.

It is a still further object of the present invention to provide an adjustment mechanism for a clutch for a motor vehicle transmission having a one way clutch and hydraulic assembly.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
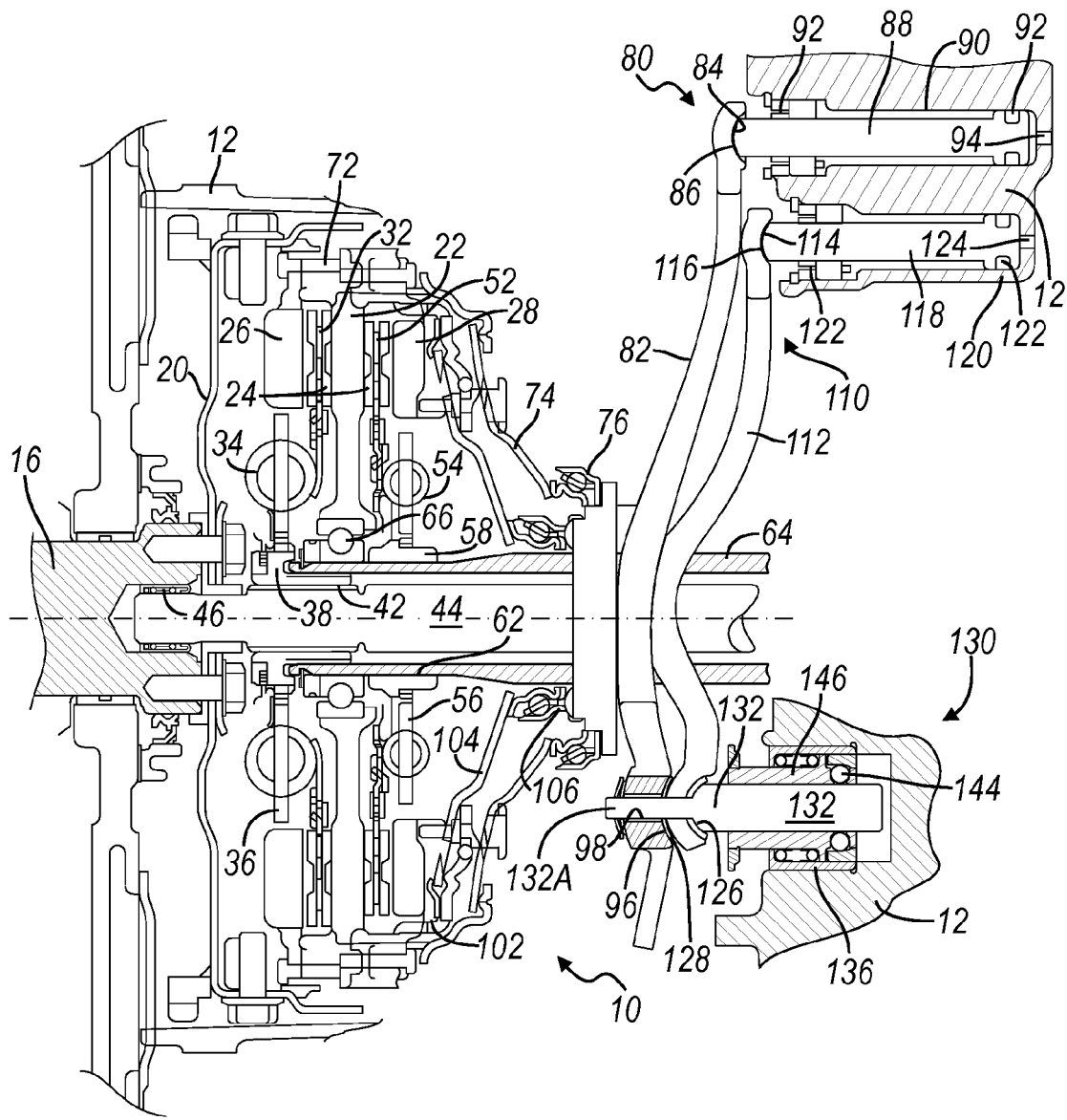
FIG. 1 is a full sectional view of a clutch for a dual clutch motor vehicle transmission incorporating the present invention.

With reference to FIG. 1, a dual main or input friction clutch for a dual clutch transmission is illustrated and generally designated by the reference number 10. The dual input clutch 10 includes a stationary housing 12 which generally surrounds the active components of the clutch 10 such as an input shaft 16 which is coupled to and driven by a prime mover (not illustrated) such as a gasoline, Diesel, flex fuel or hybrid power plant. The input shaft 16 is coupled to a clutch drive housing 20 which, in turn, is coupled to and drives a clutch drive plate 22. Spaced from both the front and rear surfaces are pressure plates: a first or front pressure plate 26 and a second or rear pressure plate 28. Disposed between the front pressure plate 26 and the clutch drive plate 22 is a first selectively driven clutch output plate or disc 32 which includes friction material or facing 24 on both surfaces. The first clutch output disc 32 is connected through a first plurality of anti-chatter springs 34 to a first output annulus 36 which is secured to a first output collar 38. The first output collar 38 is coupled by an interengaging spline set 42 to a first output shaft 44. Preferably, the first output shaft 44 includes a first bearing assembly 46 proximate its forward terminus which is received within the input shaft 16. Disposed between the rear pressure plate 28 and the clutch drive plate 22 is a second selectively driven clutch output plate or disc 52 which also includes friction material or facing 24 on both surfaces. The second clutch output disc 52 is connected through a second plurality of anti-chatter springs 54 to a second output annulus 56 which is secured to a second output collar 58. The second output collar 58 is coupled by an interengaging spline set 62 to a second output quill or drive member 64. Preferably, a second bearing assembly 66 is disposed between the second output quill or drive member 64 and the clutch drive plate 22.

A first axially moveable annular member 72 is coupled to and rotates with the first or front pressure plate 26 and extends to the rear of the clutch 10 where it is engaged by a first diaphragm spring 74. The first diaphragm spring 74 is pivoted about the clutch cover plate 102 and the inner end is engaged by a first, larger diameter clutch bearing 76. The clutch cover plate 102 is rigidly attached to the clutch drive plate 22. The first clutch bearing 76 is piloted on the second quill or drive member 64 and is axially translated by a first self-adjusting clutch actuation assembly 80.

A second or rear pressure plate 28 extends to the rear of the clutch 10 where it is engaged by a second diaphragm spring 104. The second diaphragm spring 104 is pivoted in the clutch drive housing 20 about the clutch cover plate 102 and its inner end is engaged by a second, smaller diameter clutch bearing 106. The second clutch bearing 106 is also piloted on the second quill or drive member 64 and is axially translated by a second self-adjusting clutch actuation assembly 110.

The first self-adjusting clutch actuation assembly 80 includes a first lever arm 82 that functions as a second class lever: at a first, upper end, a hemi-spherical socket 84 receives a complementary hemi-spherical terminus 86 of a first hydraulic piston 88 that is received within a first cylinder 90. The first piston 88 and the first cylinder 90 include appropriate seals 92 and a first input port 94 which receives pressurized hydraulic fluid which extends the first piston 88, translates the first lever arm 82 and the first bearing 76 to the left in FIG. 1, thereby engaging the first pressure plate 26. The second, lower end of the first lever arm 82 includes a hemi-spherical socket 96 and a through opening 98 which receives a reduced diameter portion 132A of a shaft 132 of a self-adjusting assembly 130.

The second self-adjusting clutch actuation assembly 110 includes a second lever arm 112 that also functions as a second class lever and which includes a first, upper end having a hemi-spherical socket 114 which receives a complementary hemi-spherical terminus 116 of a second hydraulic piston 118 that is received within a second cylinder 120. The second piston 118 and the second cylinder 120 include appropriate seals 122 and a second input port 124 which receives pressurized hydraulic fluid which extends the second piston 118, translates the second lever arm 112 and the second bearing 106 to the left in FIG. 1, thereby engaging the second pressure plate 28. The second, lower end of the second lever arm 112 also includes a hemi-spherical socket 126 and a through opening 128 which receives the reduced diameter portion 132A of the shaft 132 of the self-adjusting assembly 130.

Figure 2:
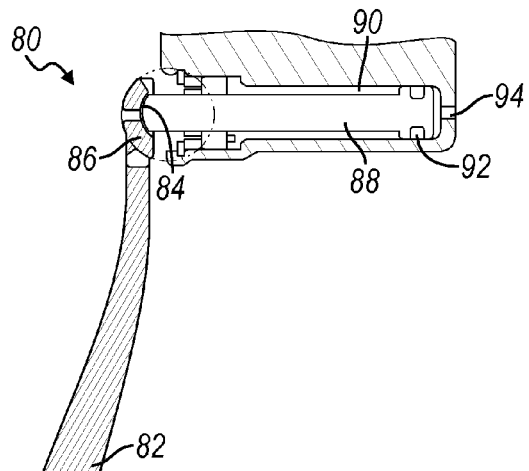
FIG. 2 is an enlarged, side elevational view of a clutch lever arm and adjustment mechanism according to the present invention.
Figure 3:
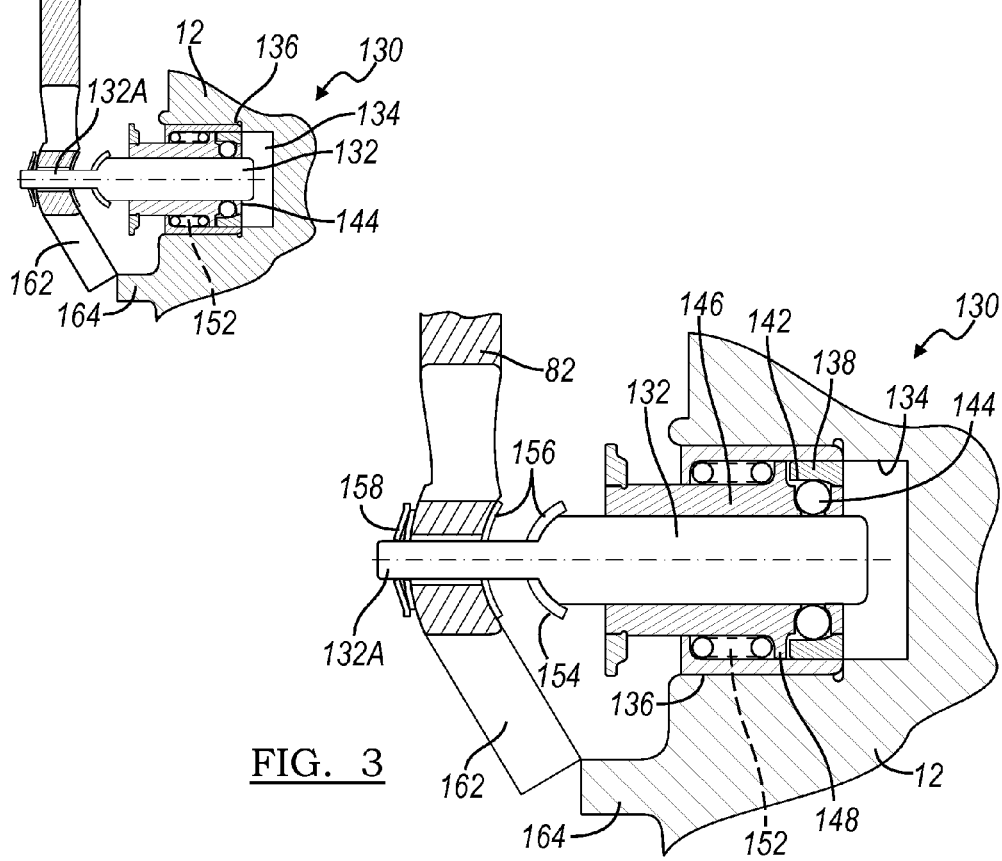
FIG. 3 is a greatly enlarged, sectional view of a portion of a clutch lever arm and adjustment mechanism according to the present invention.

Referring now to FIGS. 2 and 3, it will be appreciated that only the first lever arm assembly 80 is illustrated because only the first lever arm 82 effects self adjustment of the clutches as will be described below. It should be understood, however, that the self-adjusting assembly 130 is connected to and adjusts both lever arms 82 and 102, as illustrated in FIG. 1. The self-adjusting assembly 130 is essentially a linear one way clutch which functions as the pivot point of the first lever arm 82 and the second lever arm 102. The self-adjusting linear one way clutch assembly 130 is mounted and secured within an opening 134 of the stationary housing 12. The self-adjusting linear one way clutch assembly 130 includes a tubular or cylindrical housing 136 which receives an annular ramp member 138 having a frusto-conical inner surface 142 which engages a plurality of balls 144. The balls 144, in turn, engage the shaft 132. An intermediate collar 146 resides between the shaft 132 and the housing 136 and includes a shoulder or flange 148. The balls 144 are disposed on one side of the flange 148 and a compression spring 152 is disposed on the opposite side of the flange 148 and biases the balls 144 toward the annular ramp member 138 and the shaft 132. The shaft 132 also includes a hemi-spherical surface 154 at the transition to the reduced diameter portion 132A and friction reducing hemi-spherical washers 156. A fastener 158 such as a push-on retainer or similar component retains the lever arms 82 and 102 on the reduced diameter portion 132A of the shaft 132.

The first lever arm 82 includes an extension 162 which terminates proximate a boss, lug or stop 164 of the housing 12. As illustrated in FIGS. 1, 2 and 3, as the clutch friction material or facing 24 wears and reduces in thickness, the upper portion of the first lever arm 82 will travel farther to the left to achieve the same clutch action when the facing 24 was thicker. Accordingly, the extension 162 on the first lever arm 82 will eventually contact the boss or stop 164. When the first hydraulic piston 88 is activated and translated, the boss or stop 164 will act as a pivot point, drawing the shaft 132 out of the self-adjusting assembly 130 and resetting the pivot point to compensate for wear of the clutch facing 24 and reduce pre-travel of the clutch activation linkage.

Two features should be noted and appreciated. First of all, it is apparent from the foregoing description that only wear of the first clutch effects self-adjustment. In a dual clutch transmission, the clutches are associated with alternate gears, e.g., a first clutch with first, third and fifth gears, a second clutch with reverse, second, fourth and sixth gears. Thus clutch wear tends to be quite uniform and sensing wear of one clutch and utilizing it as the basis to adjust both clutches has been found to be satisfactory. Second of all, it should be apparent that the single self-adjustment assembly 130 is thus wholly suited for use with a single clutch and single lever arm in a conventional manual transmission.

Figure 4:
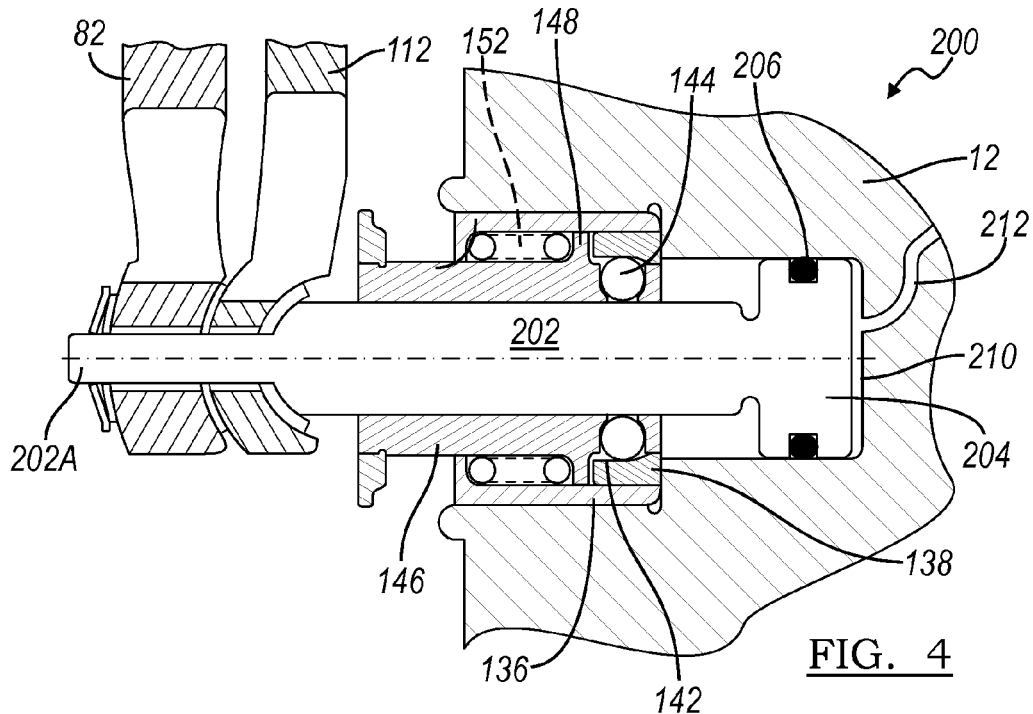
FIG. 4 is an enlarged, side elevational view of clutch lever arms and an adjustment mechanism having hydraulic biasing according to the present invention.

Referring now to FIG. 4, a first alternate embodiment self-adjusting mechanism is illustrated and generally designated by the reference number 200. Rather than incorporating the lever arm extension 162 and the lug or stop 164 (illustrated in FIGS. 1, 2 and 3), the first alternate embodiment 200 incorporates a hydraulic self-adjuster. As such, the first alternate embodiment 200 includes the tubular housing 136, the annular ramp member 138 having the frusto-conical inner surface 142 which engages the plurality of balls 144, the intermediate collar 146 having the shoulder or flange 148 and the compression spring 152. An elongate shaft 202 includes a reduced diameter portion 202A which engages the lower ends of the lever arms 82 and 112 and an enlarged diameter portion or piston 204 having an O-ring seal 206 received therein. A fluid chamber 210 is provided with pressurized hydraulic fluid through a port 212. In the first alternate embodiment 200, sensors (not illustrated) sense or determine increased travel of the first and/or second lever arms 82 and 112 and a hydraulic controller (also not illustrated) supplies pressurized hydraulic fluid to the fluid chamber 210 to translate the piston 204 and the shaft 202 to reset the pivot point of the lever arms 82 and 112. The annular ramp member 138 and the balls 144 again function as a linear one way clutch and maintain the position of the shaft 202 after it translates to compensate for clutch facing wear and reduce pre-travel.

Figure 5:
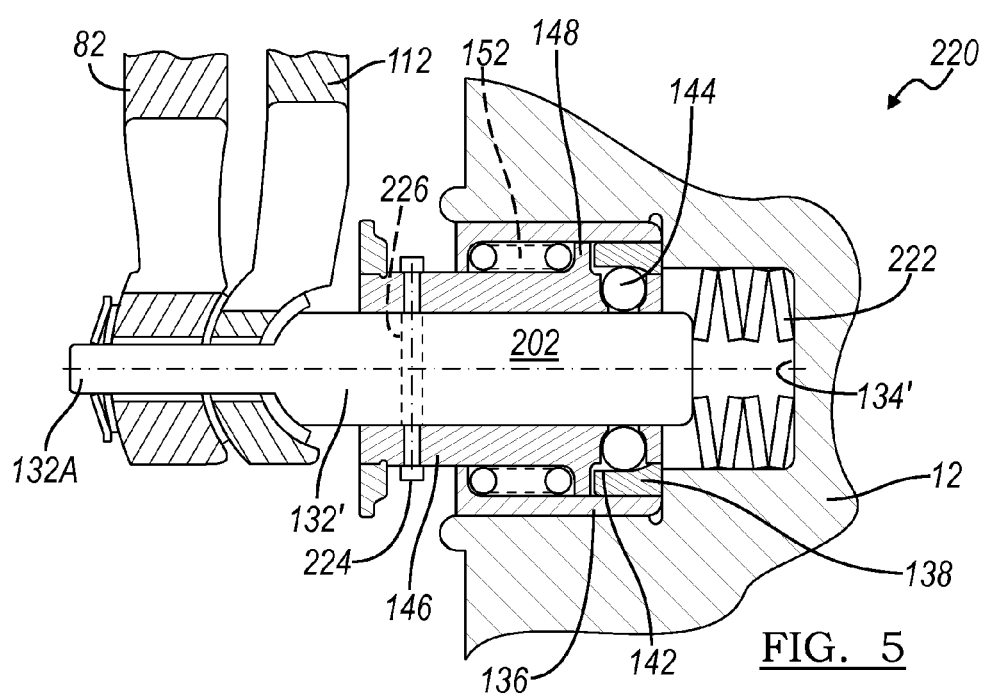
FIG. 5 is an enlarged, side elevational view of clutch lever arms and an adjustment mechanism having mechanical spring biasing according to the present invention.

Referring now to FIG. 5, a second alternate embodiment self-adjusting mechanism is illustrated and generally designated by the reference number 220. Rather than incorporating the lever arm extension 162 and the lug or stop 164 (illustrated in FIGS. 1, 2 and 3) or the hydraulically assisted shaft 202 and piston 204 of the first alternate embodiment 200, the second alternate embodiment 220 includes a passive biasing assembly. Accordingly, the second alternate embodiment 220 includes a shaft 132' having the reduced diameter portion 132A, the tubular housing 136, the annular ramp member 138 having the frusto-conical inner surface 142 which engages the plurality of balls 144, the intermediate collar 146 having the shoulder or flange 148 and the compression spring 152. An opening 134' in the housing 12 is somewhat larger that the opening 134 illustrated in FIGS. 1, 2 and 3 and receives a plurality of springs washers 222 such as Belleville springs or wave washers. The spring washers 222 provide a passive biasing force to the shaft 132' which assists translation and resetting of the pivot point of the lever arms 82 and 112 to adjust for clutch wear and reduce pre-travel. In order to assist assembly of the alternate embodiment 220, a pin 224 may be disposed within a transverse bore 226 which extends through the collar 146 and the shaft 132' to retain these components in the relative position illustrated in FIG. 5 until they are assembled at which time the pin 224 may be removed.

The description of the invention is merely exemplary in nature and variations that do not depart from the gist of the invention are intended to be within the scope of the invention. Such variations are not to be regarded as a departure from the spirit and scope of the invention.

What is claimed is:

1. A wear compensating actuation assembly for a friction clutch comprising, in combination,
   a lever arm having a pair of ends,
   a linear actuator having an output linked to one of said pair of ends,
   a location on said lever arm between said ends for applying force to a friction clutch, and
   a wear compensating mechanism associated with another of said pair of ends, said wear compensating mechanism including a linear one way clutch having a uni-directionally moving member coupled to said lever arm proximate said another of said pair of ends and a stop disposed in alignment with said another end.

2. The actuation assembly of claim 1 whereby activation of said linear actuator translates said output of said linear actuator and applies a friction clutch and contact between said another of said pair of ends and said stop uni-directionally translates said member and resets a pivot point of said another of said pair of ends.

3. The actuation assembly of claim 1 wherein said linear actuator is a hydraulic piston and cylinder assembly.

4. The actuation assembly of claim 1 wherein said linear one way clutch includes a frusto-conical ramp disposed about said member and a plurality of balls disposed between said ramp and said member.

5. The actuation assembly of claim 1 further including a friction clutch operably disposed adjacent said location on said lever arm.

6. The actuation assembly of claim 1 further including a stationary housing and wherein said stop is attached to said housing.

7. The actuation assembly of claim 1 wherein said uni-directionally moving member is a shaft and further including a spherical bearing operably disposed between said shaft and said lever arm.

8. An actuating and compensating assembly for a friction clutch comprising, in combination,
   a lever arm having a first actuator end and a second pivot end,
   a linear actuator having an output coupled to said first end,
   said lever arm having a location between said ends where force is applied to a friction clutch, and
   a wear compensating mechanism associated with said pivot end, said wear compensating mechanism including a linear one way clutch having a uni-directionally moving member coupled to said lever arm proximate said pivot end and means for translating said moving member toward said lever arm,
   whereby translation of said moving member compensates for clutch facing wear.

9. The actuating and compensating assembly of claim 8 wherein said linear actuator is a hydraulic piston and cylinder assembly.

10. The actuating and compensating assembly of claim 8 wherein said linear one way clutch includes a frusto-conical ramp disposed about said member and a plurality of balls disposed between said ramp and said member.

11. The actuating and compensating assembly of claim 8 further including a friction clutch operably disposed adjacent said location on said lever arm.

12. The actuating and compensating assembly of claim 8 wherein said means for translating said moving member include one of a hydraulic piston and a compression spring.

13. The actuating and compensating assembly of claim 8 wherein said uni-directionally moving member is a shaft and further including a spherical bearing operably disposed between said shaft and said lever arm.

14. The actuating and compensating assembly of claim 8 wherein said means for translating said moving member includes a stationary stop and an portion of said lever arm aligned with and engagable with said stop.

15. A friction clutch having a wear compensating actuator assembly comprising, in combination,
   an input shaft coupled to and driving a friction clutch drive member,
   an output shaft coupled to and driven by a friction clutch driven member,
   means for biasing said drive and said driven members together,
   a lever arm having an actuator end and a pivot end,
   a linear actuator having an output coupled to said actuator end of said lever arm,
   a clutch bearing, said lever arm having a location between said ends where force is applied to said clutch bearing, and a wear compensating mechanism associated with said pivot end of said lever arm, said wear compensating mechanism including a linear one way clutch having a uni-directionally moving member coupled to said pivot end of said lever arm and a stationary stop disposed in alignment with said pivot end.

16. The friction clutch of claim 15 wherein said linear actuator is a hydraulic piston and cylinder assembly.

17. The friction clutch of claim 15 further including a second lever arm having an actuator end and a pivot end, said pivot end associated with said wear compensating mechanism.

18. The friction clutch of claim 15 wherein said linear one way clutch includes a frusto-conical ramp disposed about said member and a plurality of balls disposed between said ramp and said member.

19. The friction clutch of claim 15 wherein said linear one way clutch includes an annular ramp member disposed about said moving member and a plurality of balls disposed between said annular ramp member and said moving member.

20. The friction clutch of claim 15 wherein said uni-directionally moving member is a shaft and further including a spherical bearing operably disposed between said shaft and said lever arm.

* * * * *